United States Patent
Li et al.

(10) Patent No.: US 11,340,801 B2
(45) Date of Patent: May 24, 2022

(54) DATA PROTECTION METHOD AND ELECTRONIC DEVICE IMPLEMENTING DATA PROTECTION METHOD

(71) Applicant: Fulian Precision Electronics (Tianjin) Co., LTD., Tianjin (CN)

(72) Inventors: Chia-En Li, New Taipei (TW); Po-Hui Lu, Miao-Li Hsien (TW); Kuo-Wei Lee, New Taipei (TW); Yao-Wen Tung, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/095,628

(22) Filed: Nov. 11, 2020

(65) Prior Publication Data
US 2022/0066659 A1   Mar. 3, 2022

(30) Foreign Application Priority Data

Sep. 1, 2020   (CN) .......................... 202010905546.7

(51) Int. Cl.
*G06F 3/06* (2006.01)
*H04L 9/32* (2006.01)

(52) U.S. Cl.
CPC .......... *G06F 3/0623* (2013.01); *G06F 3/0622* (2013.01); *G06F 3/0644* (2013.01); *G06F 3/0679* (2013.01); *H04L 9/32* (2013.01)

(58) Field of Classification Search
CPC .... G06F 3/0622; G06F 3/0623; G06F 3/0644; G06F 3/0679; G06F 12/1408; G06F 12/1458; G06F 12/1466; G06F 21/31; G06F 21/40; G06F 21/602; G06F 21/62; H04L 9/32; H04L 9/321
USPC ........ 711/163, 164, 173; 713/171, 193, 202; 726/17, 28, 30
See application file for complete search history.

(56) References Cited

U.S. PATENT DOCUMENTS

| 5,748,735 | A | * | 5/1998 | Ganesan | H04L 9/083 |
| | | | | | 380/282 |
| 2013/0024695 | A1 | * | 1/2013 | Kandrasheu | H04L 9/006 |
| | | | | | 713/175 |
| 2014/0337628 | A1 | * | 11/2014 | Amato | H04L 9/0825 |
| | | | | | 713/171 |
| 2014/0380054 | A1 | * | 12/2014 | Roth | H04L 9/14 |
| | | | | | 713/171 |
| 2015/0220756 | A1 | * | 8/2015 | Hoseley | H04L 9/3263 |
| | | | | | 713/193 |
| 2016/0142387 | A1 | * | 5/2016 | Lockhart | H04L 63/061 |
| | | | | | 713/171 |

(Continued)

FOREIGN PATENT DOCUMENTS

CN   104662870 A   5/2015

*Primary Examiner* — Gary J Portka
(74) *Attorney, Agent, or Firm* — ScienBiziP, P.C.

(57) ABSTRACT

A data protection method includes generating a decryption key acquisition request through a first operation account when encrypted data is received, obtaining the decryption key from a data security area through a second operation account in response that the decryption key acquisition request is an authorized request, using the decryption key to decrypt the encrypted data through the first operation account and obtaining decrypted data, mounting a data partition, and storing the decrypted data in the data partition through the first operation account.

16 Claims, 3 Drawing Sheets

(56) References Cited

U.S. PATENT DOCUMENTS

2020/0364323 A1* 11/2020 Bendersky ............ H04L 9/3263

* cited by examiner

DATA PROTECTION METHOD AND ELECTRONIC DEVICE IMPLEMENTING DATA PROTECTION METHOD

FIELD

The subject matter herein generally relates to a field of data protection, and more particularly to a data protection method and an electronic device implementing the data protection method.

BACKGROUND

At present, it is possible to encrypt data. However, in practice, if an unauthorized operator uses a system administrator account, it may be easy to obtain various data of the system. Thus, the data security may not be reliable. Therefore, how to improve data security is a technical problem that needs to be resolved.

BRIEF DESCRIPTION OF THE DRAWINGS

Implementations of the present disclosure will now be described, by way of embodiments, with reference to the attached figures.

DETAILED DESCRIPTION

Figure 1:
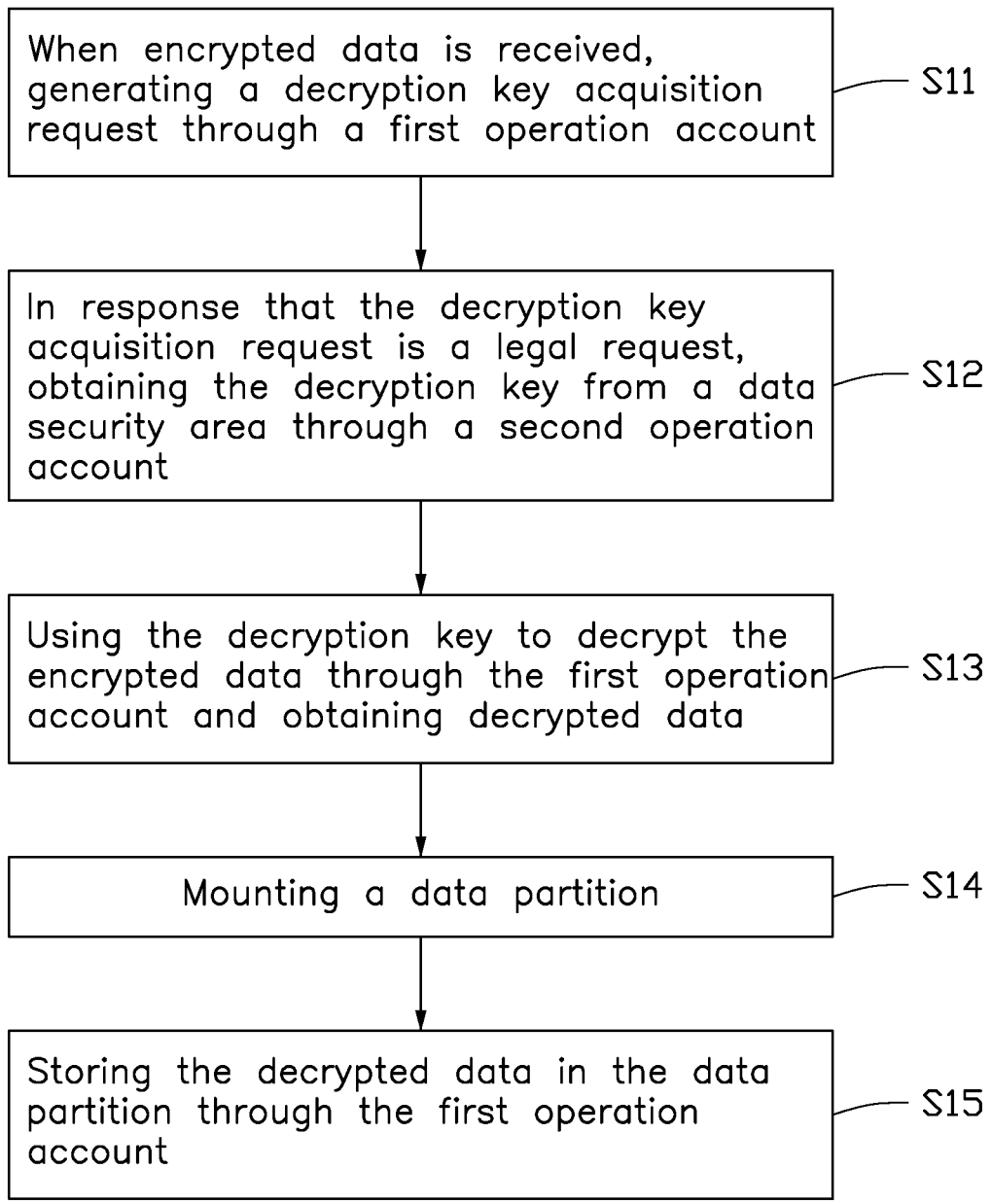
FIG. 1 is a flowchart of an embodiment of a data protection method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a flowchart of an embodiment of a data protection method. According to different needs, the order of blocks in the flowchart can be changed, and some blocks can be omitted or combined.

At block S11, when encrypted data is received, a decryption key acquisition request is generated through a first operation account.

The first operation account has permission to request a decryption key. In one embodiment, the decryption key acquisition request generated by the first operation account is determined to be an authorized request, and the decryption key acquisition request not generated by the first operation account is determined to be an unauthorized request.

In one embodiment, when the encrypted data is received, the encrypted data is processed by a preset data management program, and the data management program stores authentication information, such as an account number, password, etc., of the first operation account. The data management program can use the first operation account to perform operations related to corresponding permissions, for example, to generate the decryption key acquisition request.

In one embodiment, when the encrypted data is received and before generating the decryption key acquisition request through the first operation account, the data protection method further includes confirming all operation accounts. A permission setting of all the operation accounts which have been confirmed is performed through a permission setting method of a file access control list (ACL). All operation accounts include a first operation account and a second operation account, and different operation accounts may have different operation permissions. The permission setting method of the file access control list can be used to grant specific permissions to specific users (accounts).

At block S12, when the decryption key acquisition request is an authorized request, the decryption key is obtained from a data security area through a second operation account.

The second operation account has permission to obtain the decryption key from the data security area.

The data security area may be a hardware encryption component based on TrustZone technology. TrustZone is a hardware architecture designed to provide a security framework for electronic devices.

It is first determined whether the decryption key acquisition request is an authorized request, and authentication information carried by the authorized request can be used to determine whether the decryption key acquisition request is initiated by the first operation account. When the decryption key acquisition request is initiated by the first operation account, and it is determined that the decryption key acquisition request is an authorized request, the decryption key can be obtained from the data security area through the second operation account. The data security area verifies whether the second operation account has the permission to obtain the decryption key. When the second operation account has the permission to obtain the decryption key, it is allowed to obtain the decryption key. If an operation account does not have the corresponding permission, it is denied to obtain the decryption key.

In one embodiment, the obtained decryption key may be temporarily stored in a volatile memory, such as a random access memory, which other programs may access to obtain and use the decryption key.

In one embodiment, the data protection method further includes:

When the decryption key acquisition request is an unauthorized request, stopping responding to the decryption key acquisition request and discarding the decryption key acquisition request;

Generating second prompt information to prompt that the decryption key acquisition request is an unauthorized request; and Outputting the second prompt information.

At block S13, the decryption key is used to decrypt the encrypted data through the first operation account, and decrypted data is obtained.

In one embodiment, after the preset data management program obtains the decryption key through the second operation account, a preset data management program transmits the decryption key to the first operation account to perform data decryption on the encrypted data, thereby obtaining the decrypted data.

The first operation account has the permission to use the decryption key to decrypt the encrypted data.

In one embodiment, the data protection method further includes:

When a decryption of the encrypted data using the decryption key fails, deleting the decryption key;

Generating alarm information; and

Sending the alarm information to a preset terminal.

In one embodiment, after obtaining the decrypted data, the data protection method further includes:

Deleting the decryption key;

Generating first prompt information to prompt a successful decryption; and

Outputting the first prompt information.

At block S14, a data partition is mounted.

In one embodiment, mounting may refer to a process in which an operating system makes computer files and directories on a storage device available to users through a file system of a computer.

A data partition is an encrypted data storage area, and a permission is required to access the data partition.

At block S15, the decrypted data is stored in the data partition through the first operation account.

The first operation account has the permission to access the data partition.

In one embodiment, the preset data management program can store the decrypted data in the data partition through the first operation account. When the decrypted data is stored, the data partition will verify identity information of the first operation account. If the data partition only grants permission to the first operation account, the data partition can only be accessed through the first operation account.

In summary, the decryption key acquisition request is generated through the first operation account, and the decryption key is obtained from the data security area through the second operation account. The decryption key decrypts the encrypted data through the first operation account to obtain decrypted data. The decrypted data is stored in the data partition through the first operation account. Performing different operations through different operation accounts avoids the risk of data leakage due to a single account being hacked. At the same time, the decryption key is stored in the data security area, which further improves data security.

Figure 2:
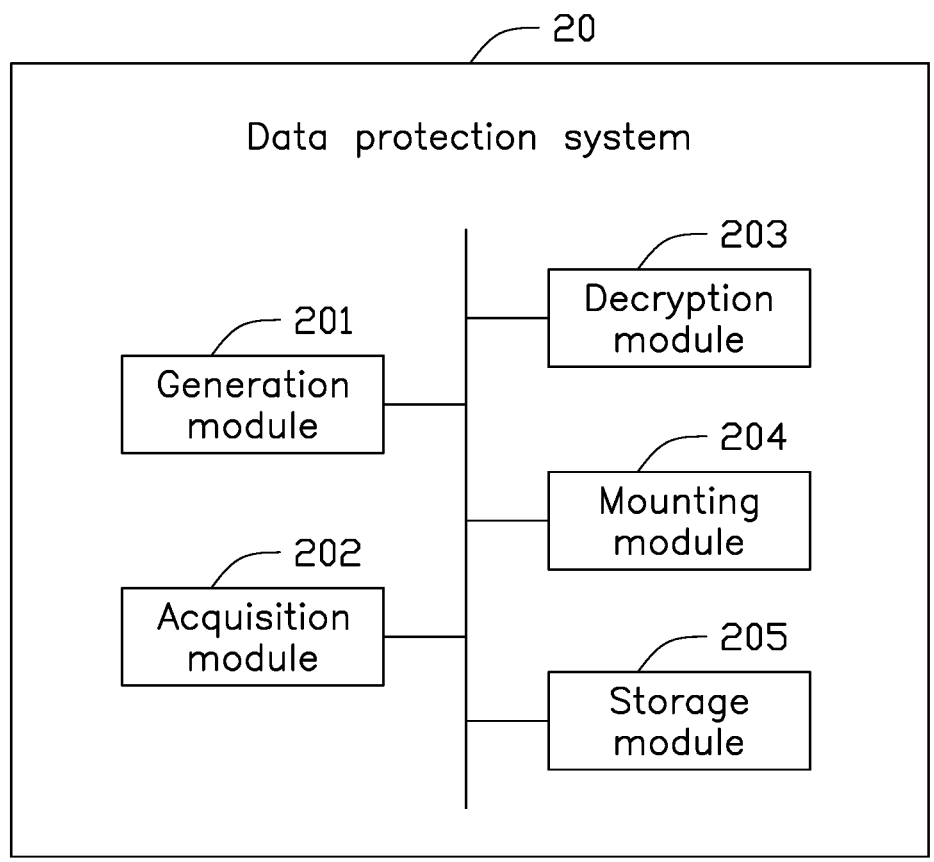
FIG. 2 is a schematic block diagram of function modules of a data protection system.

FIG. 2 is a schematic block diagram of functional modules of a data protection system 20 according to an embodiment of the present disclosure. The data protection system 20 can run in an electronic device. The data protection system 20 may include multiple functional modules composed of program code segments. The program code segments of the data protection system 20 may be stored in a memory and executed by at least one processor to execute a portion or all of the blocks in the data protection method described in FIG. 1.

In one embodiment, the data protection system 20 includes a generation module 201, an acquisition module 202, a decryption module 203, a mounting module 204, and a storage module 205.

The generation module 201 is configured to generate the decryption key acquisition request through the first operation account when the encrypted data is received. A method of generating the decryption key acquisition request through the first operation account when the encrypted data is received is described in block S11 in the data protection method in FIG. 1 and will not be repeated here.

The acquisition module 202 is configured to obtain the decryption key from the data security area through the second operation account if the decryption key acquisition request is an authorized request. A method of obtaining the decryption key from the data security area through the second operation account if the decryption key acquisition request is an authorized request is described in block S12 in the data protection method in FIG. 1 and will not be repeated here.

The decryption module 203 is configured to decrypt the encrypted data using the decryption key through the first operation account to obtain the decrypted data. A method of decrypting the encrypted data using the decryption key through the first operation account to obtain the decrypted data is described in block S13 in the data protection method in FIG. 1 and will not be repeated here.

The mounting module 204 is configured to mount the data partition. A method of mounting the data partition is described in block S14 in the data protection method in FIG. 1 and will not be repeated here.

The storage module 205 is configured to store the decrypted data in the data partition through the first operation account. A method of storing the decrypted data in the data partition through the first operation account is described in block S15 in the data protection method in FIG. 1 and will not be repeated here.

In one embodiment, the data protection system 20 may further include a first deletion module, a sending module, a second deletion module, a first output module, a stopping module, a second output module, a determination module, and a setting module.

The first deletion module is configured to delete the decryption key when the decryption key fails to decrypt the encrypted data.

The generation module 201 is further configured to generate alarm information of the decryption failure;

The sending module is configured to send the alarm information to a preset terminal. When the decryption key fails to decrypt the encrypted data, the decryption key is deleted, the alarm information is generated, and the alarm information is sent to the preset terminal.

The second deletion module is configured to delete the encryption key after the decryption module 203 decrypts the encrypted data and obtains the decrypted data and before the mounting module 204 mounts the data partition.

The generation module 201 is further configured to generate the first prompt information to prompt successful decryption.

The first output module is configured to output the first prompt information.

After obtaining the decrypted data, the decryption key is deleted, and then the first prompt information for prompting successful decryption is generated, and the first prompt information is output.

The stopping module is configured to stop responding to the decryption key acquisition request if the decryption key acquisition request is an unauthorized request and discard the decryption key acquisition request.

The generation module 201 is further configured to generate second prompt information. The second prompt information is used to prompt that the decryption key acquisition request is an unauthorized request.

The second output module is configured to output the second prompt information.

If the decryption key acquisition request is an unauthorized request, the decryption key acquisition request is stopped being responded to and then discarded. Then the second prompt information is generated to prompt that the decryption key acquisition request is an unauthorized request, and the second prompt information is output.

The determination module is configured to confirm all operation accounts when the encrypted data is received and before the generation module 201 generates the decryption key acquisition request through the first operation account.

The setting module is configured to set the permission of all the operation accounts which have been confirmed through a permission setting method of a file access control list (ACL). All operation accounts include a first operation account and a second operation account, and different operation accounts have different operation permissions. The permission setting method of the file access control list can be used to grant specific permissions to specific users (accounts).

Figure 3:
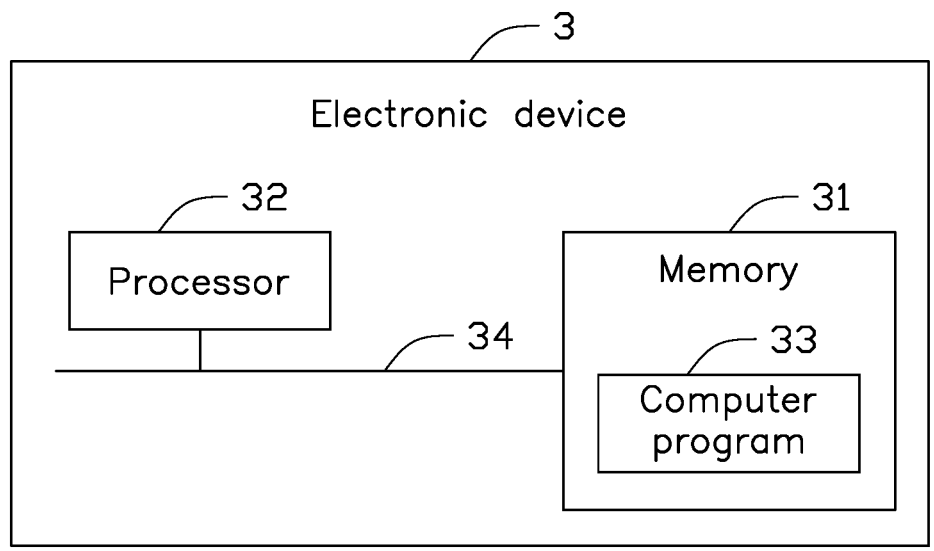
FIG. 3 is a schematic block diagram of an electronic device.

FIG. 3 is a schematic block diagram of an electronic device 3 according to an embodiment of the present disclosure. The electronic device 3 includes a memory 31, at least one processor 32, a computer program 33 stored in the memory 31 and executed by the at least one processor 32, and at least one communication bus 34.

The schematic diagram shown in FIG. 3 is only an example of the electronic device 3, and does not constitute a limitation on the electronic device 3. It may include more or less components than shown in the figure, a combination of components, or different components. For example, the electronic device 3 may also include input and output devices, network access devices, and so on.

The electronic device 3 includes, but is not limited to, any electronic product that can interact with a user through a keyboard, a mouse, a remote control, a touch panel, or a voice control device, for example, a personal computer, a tablet computer, a smart phone, a personal digital assistant, a game console, an Internet protocol television, a smart wearable device, etc. The network where the electronic device 3 is located includes, but is not limited to, the Internet, a wide area network, a metropolitan area network, a local area network, a virtual private network, etc.

The at least one processor 32 may be a central processing unit or other general-purpose processor, digital signal processor, application specific integrated circuit, field-programmable gate array, or other programmable logic device, transistor logic device, discrete hardware component, etc. The processor 32 can be a microprocessor or any conventional processor. The processor 32 is a control center of the electronic device 3 and connects various parts of the entire electronic device 3 through various interfaces and lines.

The memory 31 may be used to store the computer program 33 and/or modules. The processor 32 runs or executes the computer programs and/or modules stored in the memory 31 and calls the computer programs and/or modules stored in the memory 31. The memory 31 may mainly include a storage program area and a storage data area, wherein the storage program area may store an operating system, an application program required by at least one function (such as a sound playback function, an image playback function, etc.). The storage data area may store data created in accordance with the use of the electronic device 3. In addition, the memory 31 may include a non-volatile memory, such as a hard disk, a memory, a plug-in hard disk, a smart memory card, a secure digital card, a flash memory card, at least one disk storage device, flash memory device, etc.

With reference to FIG. 1, the memory 31 in the electronic device 3 stores multiple instructions to implement the data protection method, and the processor 32 executes the multiple instructions to implement the blocks of the data protection method.

If the integrated modules of the electronic device 3 are implemented in the form of a software functional unit and sold or used as an independent product, it can be stored in a computer readable storage medium. Based on this understanding, the present disclosure implements all or part of the processes in the above-mentioned embodiments and methods, and can also be completed by instructing relevant hardware through a computer program. The computer program can be stored in a computer-readable storage medium. When the program is executed by the processor, the steps of the foregoing method embodiments can be implemented. Wherein, the computer program code may be in the form of source code, object code, executable file, or some intermediate forms. The computer-readable medium may include any entity or device capable of carrying the computer program code, recording medium, U-disk, mobile hard disk, magnetic disk, optical disk, computer memory, and read-only memory.

The modules described as separate components may or may not be physically separated, and the components displayed as modules may or may not be physical units, that is, they may be located in one place, or they may be distributed on multiple network units. Some or all of the modules may be selected according to actual needs to achieve the objectives of the solutions of the embodiments.

In addition, the functional modules in each embodiment of the present disclosure may be integrated into one processing unit, or each unit may exist alone physically, or two or more units may be integrated into one unit. The above-mentioned integrated unit may be implemented in the form of hardware, or may be implemented in the form of hardware plus software functional modules.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A data protection method comprising:
when encrypted data is received, generating a decryption key acquisition request through a first operation account, wherein the first operation account comprises a first account number stored in a data management program, and the first operation account has a permission to request the decryption key, a permission to use the decryption key to decrypt the encrypted data, a permission to access a data partition;

in response that the decryption key acquisition request is an authorized request, obtaining the decryption key from a data security area through a second operation account, wherein the second operation account comprises a second account number stored in the data management program, and the second operation account has a permission to obtain the decryption key from the data security area;

transmitting the decryption key from the second operation account to the first operation account, and using the decryption key to decrypt the encrypted data through the first operation account and obtaining decrypted data;

mounting the data partition; and storing the decrypted data in the data partition through the first operation account.

2. The data protection method of claim 1, further comprising:

when a decryption of the encrypted data using the decryption key fails, deleting the decryption key;

generating alarm information to prompt a decryption failure; and sending the alarm information to a preset terminal.

3. The data protection method of claim 1, wherein after using the decryption key to decrypt the encrypted data through the first operation account to obtain the decrypted data and before mounting the data partition, the data protection method further comprises:

deleting the decryption key;

generating first prompt information to prompt a successful decryption; and outputting the first prompt information.

4. The data protection method of claim 1, further comprising:

in response that the decryption key acquisition request is an unauthorized request, stopping responding to the decryption key acquisition request and discarding the decryption key acquisition request;

generating second prompt information to prompt that the decryption key acquisition request is an unauthorized request; and outputting the second prompt information.

5. The data protection method of claim 4, wherein when the encrypted data is received and before generating the decryption key acquisition request through the first operation account, the data protection method further comprises:

confirming all operation accounts; and setting permission settings of all the operation accounts which have been confirmed through a permission setting method of a file access control list.

6. The data protection method of claim 5, wherein:

all operation accounts comprise a first operation account and a second operation account, and different operation accounts have different operation privileges.

7. The data protection method of claim 4, wherein:

permission authentication is required to access the data partition.

8. An electronic device comprising:

a processor; and a storage medium storing a plurality of instructions, which when executed by the processor, cause the processor to:

when encrypted data is received, generate a decryption key acquisition request through a first operation account, wherein the first operation account comprises a first account number stored in a data management program, and the first operation account has a permission to request the decryption key, a permission to use the decryption key to decrypt the encrypted data, a permission to access a data partition;

in response that the decryption key acquisition request is an authorized request, obtain the decryption key from a data security area through a second operation account wherein the second operation account comprises a second account number stored in the data management program, and the second operation account has a permission to obtain the decryption key from the data security area;

transmit the decryption key from the second operation account to the first operation account, and use the decryption key to decrypt the encrypted data through the first operation account and obtain decrypted data;

mount the data partition; and store the decrypted data in the data partition through the first operation account.

9. The electronic device of claim 8, wherein the processor is further configured to:

when a decryption of the encrypted data using the decryption key fails, delete the decryption key;

generate alarm information to prompt a decryption failure; and send the alarm information to a preset terminal.

10. The electronic device of claim 8, wherein after using the decryption key to decrypt the encrypted data through the first operation account to obtain the decrypted data and before mounting the data partition, the processor is further configured to:

delete the decryption key;

generate first prompt information to prompt successful decryption; and output the first prompt information.

11. The electronic device of claim 8, wherein the processor is further configured to:

in response that the decryption key acquisition request is an unauthorized request, stop responding to the decryption key acquisition request and discard the decryption key acquisition request;

generate second prompt information to prompt that the decryption key acquisition request is an unauthorized request; and output the second prompt information.

12. The electronic device of claim 11, wherein when the encrypted data is received and before generating the decryption key acquisition request through the first operation account, the processor is further configured to:

confirm all operation accounts; and set permission settings of all the operation accounts which have been confirmed through a permission setting method of a file access control list.

13. The electronic device of claim 12, wherein:

all operation accounts comprise a first operation account and a second operation account, and different operation accounts have different operation privileges.

14. The electronic device of claim 11, wherein:

permission authentication is required to access the data partition.

15. A non-transitory storage medium having stored thereon instructions that, when executed by at least one processor of a computing device, causes the at least one processor to execute instructions of a data protection method, the method comprising:

when encrypted data is received, generating a decryption key acquisition request through a first operation account, wherein the first operation account comprises a first account number stored in a data management program, and the first operation account has a permission to request the decryption key, a permission to use the decryption key to decrypt the encrypted data, a permission to access a data partition;

in response that the decryption key acquisition request is an authorized request, obtaining the decryption key from a data security area through a second operation account, wherein the second operation account comprises a second account number stored in the data management program, and the second operation account has a permission to obtain the decryption key from the data security area;

transmitting the decryption key from the second operation account to the first operation account, and using the decryption key to decrypt the encrypted data through the first operation account and obtaining decrypted data;

mounting the data partition; and storing the decrypted data in the data partition through the first operation account.

16. The data protection method of claim 1, further comprising:

if the decryption key acquisition request is initiated by the first operation account, determining that the decryption key acquisition request is the authorized request.

* * * * *